UNITED STATES PATENT OFFICE.

PAUL VOLKMANN, OF ELBERFELD, GERMANY, ASSIGNOR TO FARBENFABRIKEN VORM. FRIEDR. BAYER & CO., OF ELBERFELD, GERMANY, A CORPORATION OF GERMANY.

GREENISH-YELLOW DYE.

969,428.  Specification of Letters Patent.  Patented Sept. 6, 1910.

No Drawing.  Application filed December 18, 1909.  Serial No. 533,876.

*To all whom it may concern:*

Be it known that I, PAUL VOLKMANN, doctor of philosophy, chemist, citizen of the German Empire, residing at Elberfeld, Germany, have invented new and useful Improvements in Greenish-Yellow Dyes, of which the following is a specification.

My invention relates to the manufacture of a new yellow azo dye by condensing 2 molecules of phenyl-hydrazin-ortho-sulfonic acid with dioxytartaric acid.

The dye has in a free state most probably the formula:

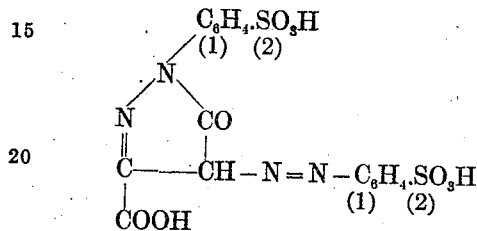

It is characterized by its good fastness to light and its valuable greenish-yellow shade.

To illustrate my process, I can proceed as follows, the parts being by weight:—150.6 parts of phenylhydrazin-ortho-sulfonic acid are stirred up with 1,000 parts of water and 60 parts of sulfuric acid (60° Bé.) To this mixture 106 parts of the sodium salt of dioxy-tartaric acid are added. The mixture is stirred for 1 hour and is then boiled for 2 hours. The dye is salted out, filtered off, mixed with sodium carbonate to make the neutral sodium salt and dried. It is in the shape of its sodium salt a yellow powder soluble in concentrated sulfuric acid with a yellow color. Upon reduction with stannous chlorid and hydrochloric acid the dye is decomposed, anilin-ortho-sulfonic acid and 1-ortho-sulfophenyl-3-carboxy-4-amino-5-pyrazolone are obtained. It produces on wool bright greenish yellow level shades, fast to light.

I claim:

The herein described new coloring matter obtainable from phenylhydrazin-ortho-sulfonic acid and dioxytartaric acid, which is in dry state in the shape of its sodium salt a yellow powder soluble in concentrated sulfuric acid with a yellow color; yielding upon reduction with stannous chlorid and hydrochloric acid anilin-ortho-sulfonic acid and 1-ortho-sulfophenyl-3-carboxy-4-amino-5-pyrazolone; and dyeing wool bright greenish-yellow shades, substantially as described.

In testimony whereof I have hereunto set my hand in the presence of two subscribing witnesses.

PAUL VOLKMANN.

Witnesses:
 OTTO KÖNIG,
 CHAS. J. WRIGHT.